US011870123B2

(12) United States Patent
Guo et al.

(10) Patent No.: US 11,870,123 B2
(45) Date of Patent: Jan. 9, 2024

(54) PHASE SHIFTER AND ANTENNA

(71) Applicant: BOE TECHNOLOGY GROUP CO., LTD., Beijing (CN)

(72) Inventors: Jingwen Guo, Beijing (CN); Qianhong Wu, Beijing (CN); Chunxin Li, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 214 days.

(21) Appl. No.: 17/621,219

(22) PCT Filed: Jan. 28, 2021

(86) PCT No.: PCT/CN2021/074083
§ 371 (c)(1),
(2) Date: Dec. 20, 2021

(87) PCT Pub. No.: WO2022/160157
PCT Pub. Date: Aug. 4, 2022

(65) Prior Publication Data
US 2023/0155265 A1 May 18, 2023

(51) Int. Cl.
*H01P 1/18* (2006.01)
*H01Q 3/34* (2006.01)

(52) U.S. Cl.
CPC ................. *H01P 1/18* (2013.01); *H01Q 3/34* (2013.01)

(58) Field of Classification Search
CPC .. H01P 1/18; H01P 1/184; H01Q 3/34; H01Q 3/36
See application file for complete search history.

(56) References Cited

U.S. PATENT DOCUMENTS

2022/0140461 A1* 5/2022 Wang .................. G02F 1/13394 333/161
2022/0231392 A1* 7/2022 Guo .......................... B81B 7/02

* cited by examiner

*Primary Examiner* — David E Lotter
(74) *Attorney, Agent, or Firm* — HOUTTEMAN LAW LLC

(57) ABSTRACT

The present disclosure provides a phase shifter and an antenna. The phase shifter includes: a substrate; a signal electrode, and a first reference electrode and a second reference electrode respectively on two sides of an extending direction of the signal electrode; an interlayer insulating layer on the signal electrode, the first reference electrode and the second reference electrode; and at least one phase control unit each including a film bridge. At least part of the at least one phase control unit further includes at least one driving structure including at least a driving electrode; at least part of the at least one driving structure has a different height from a height of the signal electrode in a direction away from the substrate; the driving structure in each phase control unit is at least partially overlapped an orthographic projection of the film bridge on the substrate.

17 Claims, 6 Drawing Sheets

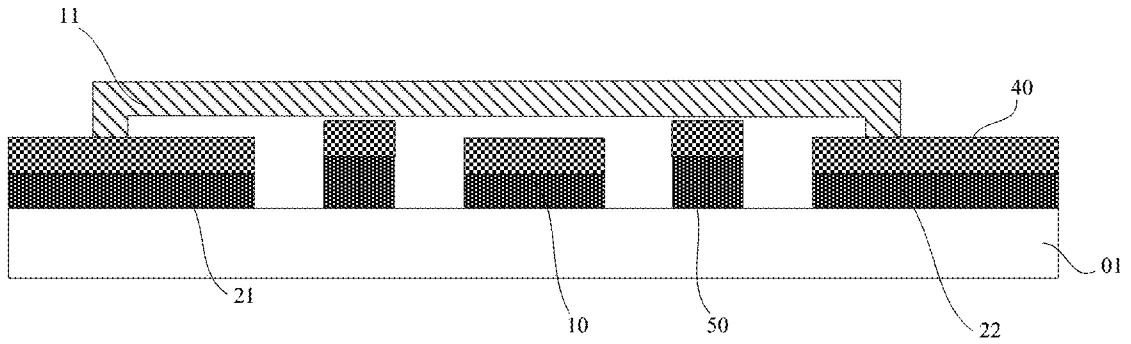
FIG. 15
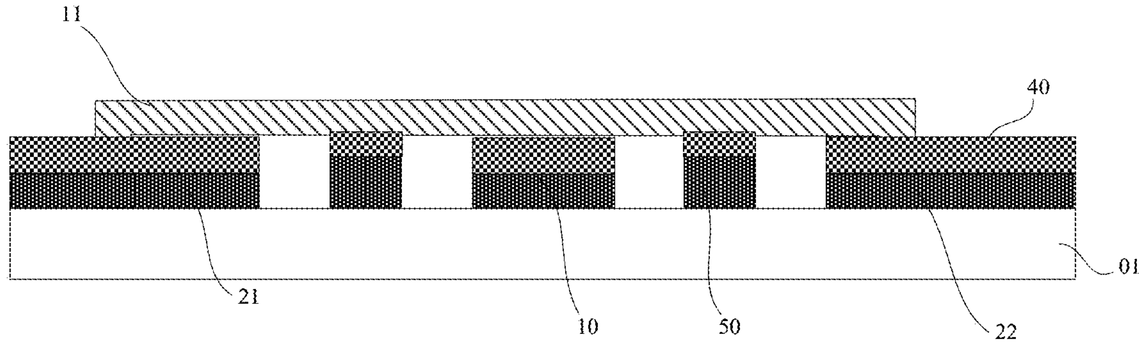
FIG. 16
| Lg | Wg | g | W | Le | We |
|---|---|---|---|---|---|
| 1.5 | 0.3 | 0.033 | 0.02 | 0.03 | 0.03 |
| **Bx** | **By** | **hs** | **hc** | **td** | **t1** |
| 0.01 | 0.01 | 0.5 | 0.0008 | 0.000245 | 0.000266 |
FIG. 17
| h/um | State | S11(17.7 GHz)/dB | S21(17.7 GHz)/dB | Δ/° |
|---|---|---|---|---|
| 0 | Up State | -28.91 | -0.07 | 0 |
| 1.3 | Down State 1 | -12.91 | -0.36 | 11.16 |
| 1.4 | Down State 2 | -4.13 | -2.43 | 36.87 |
FIG. 18

PHASE SHIFTER AND ANTENNA

CROSS-REFERENCE TO RELATED APPLICATION

This is a National Phase Application filed under 35 U.S.C. 371 as a national stage of PCT/CN2021/074083, filed on Jan. 28, 2021, the contents of which are incorporated herein in their entirety by reference.

TECHNICAL FIELD

The present disclosure belongs to the field of communication technology, and particularly relates to a phase shifter and an antenna.

BACKGROUND

A Phase shifter is a device capable of adjusting the phase of a wave. The phase shifter has been widely applied in the fields of radar, missile attitude control, accelerators, communication, instruments, even music and the like. The traditional phase shifter is mainly implemented by adopting a ferrite material, a PIN diode or a switch such as a field effect transistor. The ferrite phase shifter has relatively large power capacity and relatively low insertion loss, but the large-scale application of the ferrite phase shifter is limited by factors such as complex process, high manufacturing cost, large volume and the like. The semiconductor phase shifter has small volume and high operating speed, but has small power capacity, larger power consumption and high process difficulty. Compared to the traditional phase shifter, the micro-electro-mechanical system (MEMS) phase shifter has the advantages of small volume, light weight, short control time, low insertion loss, high loadable power and the like, and has great development and application prospects.

SUMMARY

The present disclosure aims to solve at least one of the problems of the prior art, and provides a phase shifter and an antenna.

In a first aspect, an embodiment of the present disclosure provides a phase shifter, which includes:

- a substrate;
- a signal electrode, and a first reference electrode and a second reference electrode respectively on two sides of an extending direction of the signal electrode; the signal electrode, the first reference electrode and the second reference electrode being all on the substrate;
- an interlayer insulating layer on a side, away from the substrate, of the signal electrode, the first reference electrode and the second reference electrode; and
- at least one phase control unit, each of which includes a film bridge on a side of the interlayer insulating layer facing away from the substrate; the signal electrode being in a space enclosed by the film bridge and the substrate, and two ends of the film bridge being respectively overlapped with orthographic projections of the first reference electrode and the second reference electrode on the substrate.

At least part of the at least one phase control unit further includes at least one driving structure between the substrate and the interlayer insulating layer, the driving structure includes at least a driving electrode; at least part of the at least one driving structure has a different height from a height of the signal electrode in a direction away from the substrate; the driving structure in each phase control unit is at least partially overlapped an orthographic projection of the film bridge on the substrate.

In an embodiment of the present disclosure, each phase control unit includes a plurality of driving structures, and an orthographic projection of a part of the plurality of driving structures on the substrate is between orthographic projections of the first reference electrode and the signal electrode on the substrate, and an orthographic projection of the other part of the plurality of driving structures on the substrate is between orthographic projections of the second reference electrode and the signal electrode on the substrate.

In an embodiment of the present disclosure, for any one of the phase control units, a number of the driving structures whose orthographic projections are between the orthographic projections of the first reference electrode and the signal electrode on the substrate is plural, and heights, in the direction away from the substrate, of the driving structures whose orthographic projections are between the orthographic projections of the first reference electrode and the signal electrode on the substrate are different; and/or

- a number of the driving structures whose orthographic projections are between the orthographic projections of the second reference electrode and the signal electrode on the substrate is plural, and heights, in the direction away from the substrate, of the driving structures whose orthographic projections are between the orthographic projections of the second reference electrode and the signal electrode on the substrate are different.

In an embodiment of the present disclosure, for any one of the phase control units, the plurality of driving structures are mirror-symmetrical by taking a central axis of the signal electrode as a symmetry axis.

In an embodiment of the present disclosure, for any one of the phase control units, a height of each of the plurality of driving structures in the direction away from the substrate is greater than the height of the signal electrode in the direction away from the substrate, a number of the driving structures whose orthographic projections are between the orthographic projections of the first reference electrode and the signal electrode on the substrate is plural, and heights of the driving structures whose orthographic projections are between the orthographic projections of the first reference electrode and the signal electrode on the substrate monotonically decrease in a direction pointing from the first reference electrode to the signal electrode; a number of the driving structures whose orthographic projections are between the orthographic projections of the second reference electrode and the signal electrode on the substrate is plural, and heights of the driving structures whose orthographic projections are between the orthographic projections of the second reference electrode and the signal electrode on the substrate monotonically decrease in a direction pointing from the second reference electrode to the signal electrode; or,

- the height of each of the plurality of driving structures in the direction away from the substrate is smaller than the height of the signal electrode in the direction away from the substrate, the number of the driving structures whose orthographic projections are between the orthographic projections of the first reference electrode and the signal electrode on the substrate is plural, and the heights of the driving structures whose orthographic projections are between the orthographic projections of the first reference electrode and the signal electrode on the substrate monotonically increase in the direction pointing from the first reference electrode to the signal electrode; the number of the driving structures whose orthographic projections are between the orthographic projections of the second reference electrode and the signal electrode on the substrate is plural, and the heights of the driving structures whose orthographic projections are between the orthographic projections of the second reference electrode and the signal electrode on the substrate monotonically increase in the direction pointing from the second reference electrode to the signal electrode.

In an embodiment of the present disclosure, the driving structure in any one of the phase control units includes only the driving electrode, and a height of at least part of the driving electrodes in the direction away from the substrate is different from the height of the signal electrode in the direction away from the substrate.

In an embodiment of the present disclosure, each driving structure further includes a spacer between the driving electrode and the interlayer insulating layer; a height in the direction away from the substrate of each driving electrode in the driving structure in any one of the phase control units is the same as the height of the signal electrode in the direction away from the substrate, and a height of at least part of the spacers in the direction away from the substrate is different from a thickness of the interlayer insulating layer in the direction away from the substrate.

In an embodiment of the present disclosure, the spacer and the interlayer insulating layer on each driving electrode are formed as a single piece.

In an embodiment of the present disclosure, the film bridge includes a first connection wall, a second connection wall, and a bridge deck structure opposite to the substrate; the first connection wall is at least partially overlapped with an orthographic projection of the first reference electrode on the substrate, and the second connection wall is at least partially overlapped with an orthographic projection of the second reference electrode on the substrate; the bridge deck structure includes: a first electrode portion, a second electrode portion, a first adsorption portion, a second adsorption portion and at least one first connection portion; an orthographic projection of one first electrode portion on the substrate covers an orthographic projection of one signal electrode on the substrate; an orthographic projection of one second electrode portion on the substrate covers an orthographic projection of one driving electrode on the substrate; the first adsorption portion is electrically connected with the first connection wall, and the second adsorption portion is electrically connected with the second connection wall; the first connection portion electrically connects the first electrode portion, the second electrode portion, the first adsorption portion, and the second adsorption portion.

In an embodiment of the present disclosure, the first and second connection walls are at two opposite ends of an extending direction of the bridge deck structure, respectively; and the first connection wall is at least partially overlapped with an orthographic projection of the first adsorption portion on the substrate, and the second connection wall is at least partially overlapped with an orthographic projection of the second adsorption portion on the substrate.

In an embodiment of the present disclosure, the first connection wall includes a first sub-connection wall and a second sub-connection wall respectively at two ends of the first adsorption portion in an extending direction thereof; the second connection wall includes a third sub-connection wall and a fourth sub-connection wall respectively at two ends of the second adsorption portion in an extending direction thereof; the first sub-connection wall, the second sub-connection wall, the third sub-connection wall and the fourth sub-connection wall each include a second connection portion and a first anchor portion which are electrically connected; the second connection portions of the first sub-connection wall and the second sub-connection wall are connected to the first adsorption portion; the second connection portions of the third sub-connection wall and the fourth sub-connection wall are connected to the second adsorption portion.

In an embodiment of the present disclosure, the phase shifter further includes a first switch unit on the substrate, and the first switch unit is configured to provide a bias voltage signal to the film bridge upon receipt of a first control signal.

In an embodiment of the present disclosure, the first switch unit includes a first switch transistor having a first electrode formed as a bias voltage input terminal of the first switch unit, a second electrode formed as a first output terminal of the first switch unit, and a control electrode formed as a first control terminal of the first switch unit, and the first switch transistor is configured to cause conduction between the first electrode and the second electrode in response to receiving the first control signal at the control electrode.

In an embodiment of the present disclosure, the phase shifter further includes a second switch unit on the substrate, and the second switch unit is configured to electrically connect the signal electrode to the film bridge upon receipt of a second control signal.

In an embodiment of the present disclosure, the first switch unit is further configured to electrically connect the signal electrode to the film bridge upon receipt of a second control signal.

In an embodiment of the present disclosure, a number of the film bridges in at least part of the phase control units is different; in each phase control unit, the film bridge is overlapped with an orthographic projection of the driving structure on the substrate.

In a second aspect, an embodiment of the present disclosure provides an antenna, which includes the phase shifter described above.

BRIEF DESCRIPTION OF DRAWINGS

FIG. 15 is a schematic diagram illustrating a second state of the phase shifter of FIG. 13.

FIG. 16 is a schematic diagram illustrating a second state of the phase shifter of FIG. 13.

FIG. 17 is a schematic diagram of HFSS software simulation of the phase shifter shown in FIG. 13.

FIG. 18 is a schematic diagram illustrating port parameters and phase shift parameters of the phase shifter shown in FIG. 13 after HFSS software simulation.

DETAIL DESCRIPTION OF EMBODIMENTS

In order to make one of ordinary skill in the art better understand the technical solutions of the present disclosure, the present disclosure is further described in detail with reference to the accompanying drawings and the specific embodiments below.

Unless defined otherwise, technical or scientific terms used herein shall have the ordinary meaning as understood by one of ordinary skill in the art to which the present disclosure belongs. The words "first", "second" and the like as used in the present disclosure are not intended to indicate any order, quantity, or importance, but rather are used to distinguish one element from another. Also, the term "a", "an", "the" or the like does not denote a limitation of quantity, but rather denotes the presence of at least one. The word "comprise", "include" or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right" and the like are used only to indicate relative positional relationships, and when the absolute position of the object being described is changed, the relative positional relationships may also be changed accordingly.

Figure 1:
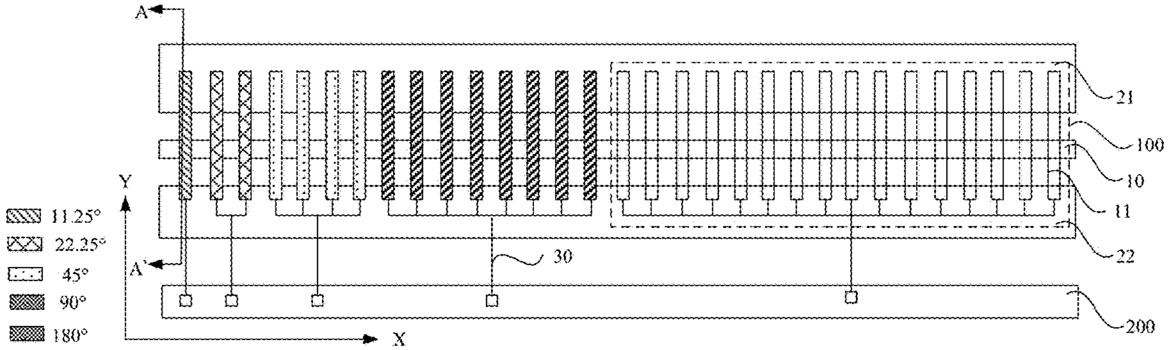
FIG. 1 illustrates a structure of an exemplary phase shifter.
Figure 2:
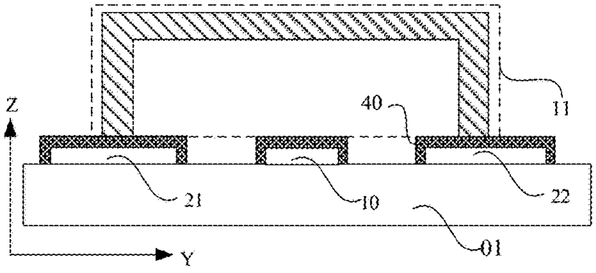
FIG. 2 is a cross-sectional view of the phase shifter of FIG. 1 along A-A'.

FIG. 1 illustrates a structure of an exemplary phase shifter; FIG. 2 is a cross-sectional view of the phase shifter of FIG. 1 along A-A'; as shown in FIGS. 1 and 2, the phase shifter includes a substrate 01, a first reference electrode, a second reference electrode, a signal electrode 10, an interlayer insulating layer 40, a plurality of phase control units 100, a control unit 200, and a direct current (DC) bias line 02.

Specifically, the signal electrode 10 is disposed on the substrate 01 and extends along a first direction X; the first reference electrode and the second reference electrode are disposed on two sides of the extending direction of the signal electrode 10, the extending directions of the first reference electrode and the second reference electrode may be the same as the extending direction of the signal electrode 10, or may intersect with the extending direction of the signal electrode 10, and for the phase shifter with a small size, it is preferable that the extending directions of the first reference electrode and the second reference electrode is the same as the extending direction of the signal electrode 10. In the embodiment of the present disclosure, description is given by taking a case that the first reference electrode, the second reference electrode, and the signal electrode 10 all extend along the first direction X as an example. In the embodiment of the present disclosure, the signal electrode 10, the first reference electrode and the second reference electrode may be arranged in a same layer and made of a same material, and the first reference electrode and the second reference electrode include but are not limited to ground electrodes. In the embodiment of the present disclosure, description is given by taking a case that the first reference electrode and the second reference electrode are ground electrodes as an example, and for convenience of description, the first reference electrode is denoted as the first ground electrode 21, and the second reference electrode is denoted as the second ground electrode 22. The interlayer insulating layer 40 is disposed on a side, away from the substrate 01, of the layer where the signal electrode 10, the first ground electrode 21, and the second ground electrode 22 are located, and the interlayer insulating layer 40 covers at least the signal electrode 10, the first ground electrode 21, and the second ground electrode 22.

The plurality of phase control units 100 are disposed on a side of the interlayer insulating layer 40 facing away from the substrate 01. Each phase control unit 100 includes at least one film bridge 11; each film bridge 11 bridges between the first ground electrode 21 and the second ground electrode 22. Specifically, each film bridge 11 is an arch structure, and includes a bridge deck structure, and a first connection wall and a second connection wall respectively connected to two ends of the bridge deck structure, the first connection wall is located on the insulating layer above the first reference electrode, the second connection wall is located on the insulating layer above the second reference electrode, and the bridge deck structure extends along a second direction Y. The second direction Y intersects with the first direction X, for example, the first direction X and the second direction Y are perpendicular to each other. The signal electrode 10 is located in a space formed between the bridge deck structure and the substrate 01. The respective film bridges 11 are electrically connected to bias current lines corresponding thereto, respectively, and the bias current lines connected to the film bridges 11 in each phase control unit 100 are connected together and to the control unit 200. When the control unit 200 does not control the bias current lines to apply bias voltages to the film bridges 11, each film bridge 11 is suspended over the signal electrode 10 without contacting the interlayer insulating layer 40 over the signal electrode 10. The bridge deck structure of the film bridge 11 has a certain degree of flexibility, and the control unit 200 inputs a DC bias voltage to the film bridge 11, and can drive the bridge deck structure of the film bridge 11 to move in a direction perpendicular to the signal electrode 10, that is, by inputting the DC bias voltage to the film bridge 11, the distance between the bridge deck structure of the film bridge 11 and the signal electrode 10 can be changed, so that the capacitance of the capacitor formed by the bridge deck structure of the film bridge 11 and the signal electrode 10 can be changed. However, in different phase control units 100, the number of the film bridges 11 is different, the distributed capacitances generated by the film bridges 11 and the signal electrode 10 after the DC bias voltage is applied are different, and accordingly, the adjusted phase shift is different, that is, each phase control unit 100 correspondingly adjusts one phase shift amount (the film bridges 11 filled with the same pattern in FIG. 1 are shown as belonging to the same phase control unit 100), so that when adjusting the phase shift amount, the corresponding phase adjusting unit is controlled to apply the voltage according to the magnitude of the phase shift amount to be adjusted.

However, since the film bridges 11 in each phase control unit 100 have the same structure and the DC bias lines 02 in each phase control unit 100 are connected together, the film bridges 11 in each phase control unit 100 can have the same displacement when the DC bias voltage is applied, and therefore, each phase control unit 100 corresponds to only one phase shift amount, that is, each phase control unit 100 has only a single-state switching state, resulting in a small number of phase shifting bits of the phase shifter.

In view of the above problem, the embodiments of the present disclosure provide the following technical solutions.

Figure 3:
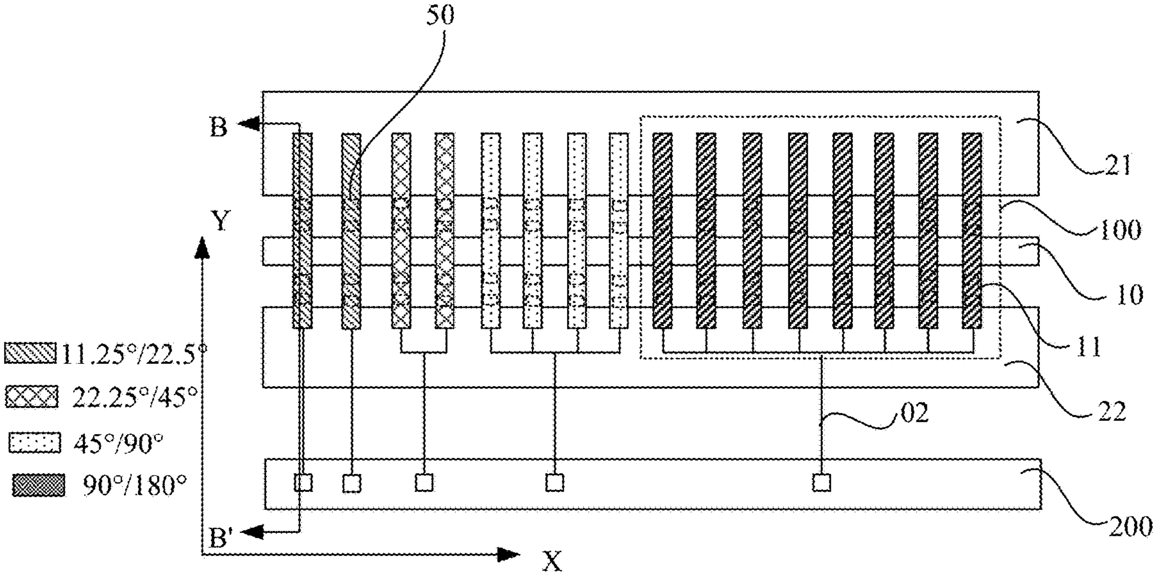
FIG. 3 illustrates a structure of a phase shifter according to an embodiment of the present disclosure.
Figure 4:
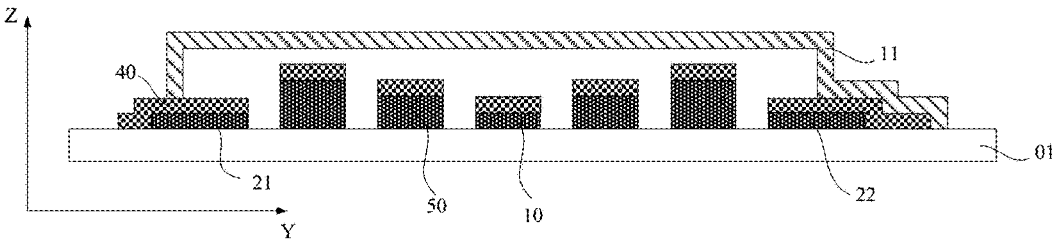
FIG. 4 is a cross-sectional view of the phase shifter of FIG. 3 along B-B'.

In a first aspect, FIG. 3 illustrates a structure of a phase shifter according to an embodiment of the present disclosure; FIG. 4 is a cross-sectional view of the phase shifter of FIG. 3 along B-B'; as shown in FIGS. 3 and 4, an embodiment of the present disclosure provides a phase shifter, including: a substrate 01, a signal electrode 10 extending in a first direction X, a first ground electrode 21, a second ground electrode 22, an interlayer insulating layer 40, and at least one phase control unit 100. The signal electrode 10, the first ground electrode 21 and the second ground electrode 22 are disposed on the substrate 01, and the first ground electrode 21 and the second ground electrode 22 are disposed at two opposite sides of the extending direction of the signal electrode 10. The interlayer insulating layer 40 is disposed on a side, away from the substrate 01, of the layer where the signal electrode 10, the first ground electrode 21, and the second ground electrode 22 are disposed. Each phase control unit 100 includes a film bridge 11 on a side of the interlayer insulating layer 40 facing away from the substrate 01; the signal electrode 10 is located in a space enclosed by the film bridge 11 and the substrate 01, and two ends of the film bridge 11 are respectively overlapped with orthographic projections of the first ground electrode 21 and the second ground electrode 22 on the substrate 01; in addition, at least part of the phase control units 100 includes not only the film bridge 11 but also at least one driving structure between the substrate 01 and the interlayer insulating layer 40, and the driving structure includes at least the driving electrode 50; at least part of the driving structures have a height different from the height of the signal electrode 10 in the direction away from the substrate 01; the driving structure in each phase control unit 100 is at least partially overlapped with the orthographic projection of the film bridge 11 on the substrate 01.

Of course, the phase shifter in the embodiment of the present disclosure also includes the control unit 200 and the DC bias line in the phase shifter shown in FIG. 1. Each film bridge 11 is electrically connected to the bias current line corresponding thereto, and the bias current lines connected to the film bridges 11 in each phase control unit 100 are connected together and to the control unit 200.

In the embodiment of the present disclosure, the driving structure is included in at least part of the phase control units 100 of the phase shifter, and the height of the driving structure and the height of the signal electrode 10 in the direction away from the substrate 01 are different, and no matter whether the driving structure or the signal electrode 10 is closer to the film bridge 11, the electrostatic attraction force to the film bridge 11 is larger when the voltage is applied to the driving electrode 50 and the signal electrode 10. When the applied voltage is gradually increased, the film bridge 11 lands on the driving structures and the signal electrode 10 of different heights from high to low in sequence to realize a plurality of stable operating states, thereby realizing multi-step phase shift. The realization of the multi-step phase shift unit is beneficial to improving the number of phase shifting bits and the phase shifting precision of the digital MEMS phase shifter. The phase shifter according to the embodiments of the present disclosure can realize the multiple operating states of a single phase control unit 100, thus, the number of the phase shift film bridges 11 adopted to form the digital MEMS phase shifter having a complete function is reduced, the reduction of movable components helps promoting the reliability and the stability of the entire system, and the reduction of the film bridges 11 also can make coplanar waveguide transmission line shortened, effectively reduce the insertion loss caused by the line loss, promote the device performance, and have very important significance.

With continued reference to FIG. 4, in some exemplary embodiments, each phase control unit 100 of the phase shifter includes a plurality of driving structures, and an orthographic projection of one part of the plurality of driving structures on the substrate 01 is located between the orthographic projections of the first ground electrode 21 and the signal electrode 10 on the substrate 01, and an orthographic projection of the other part of the plurality of driving structures on the substrate 01 is located between the orthographic projections of the second ground electrode 22 and the signal electrode 10 on the substrate 01. That is, the driving structures are disposed on both sides of the extending direction of the signal electrode 10, so that when voltages are applied to the signal electrode 10 and the driving electrodes 50 in the driving structures, the stability of the film bridge 11 when it lands on the signal electrode 10 and/or the driving structures can be improved.

In some exemplary embodiment, for any phase control unit 100, the number of the driving structures whose orthographic projections are located between the orthographic projections of the first ground electrode 21 and the signal electrode 10 on the substrate 01 is plural, and the heights of the driving structures in the direction away from the substrate 01 are different; and/or the number of the driving structures whose orthographic projections are located between the orthographic projections of the second ground electrode 22 and the signal electrode 10 on the substrate 01 is plural, and the heights of the driving structures in the direction away from the substrate 01 are different. For example, the first ground electrode 21, the second ground electrode 22, the signal electrode 10 and the driving structures are all arranged in the same layer, the number of the driving structures between the first ground electrode 21 and the signal electrode 10 is plural, the number of the driving electrodes 50 between the second ground electrode 22 and the signal electrode 10 is also plural, at the same time, the heights of the driving structures between the first ground electrode 21 and the signal electrode 10 are different, and the heights of the driving structures between the second ground electrode 22 and the signal electrode 10 are different, so that a plurality of operating states can be realized for each phase control unit 100.

Further, referring to FIG. 4, for any of the phase control units 100, the driving structures are mirror-symmetrical with respect to a central axis of the signal electrode 10 as a symmetry axis. That is, the number and arrangement of the driving structures between the first ground electrode 21 and the signal electrode 10 are the same as those between the second ground electrode 22 and the signal electrode 10. In this case, when voltages are applied to the signal electrode 10 and the driving electrodes 50 in the driving structures, the stability of the film bridge 11 when it lands on the signal electrode 10 and/or the driving structures can be improved.

Figure 5:
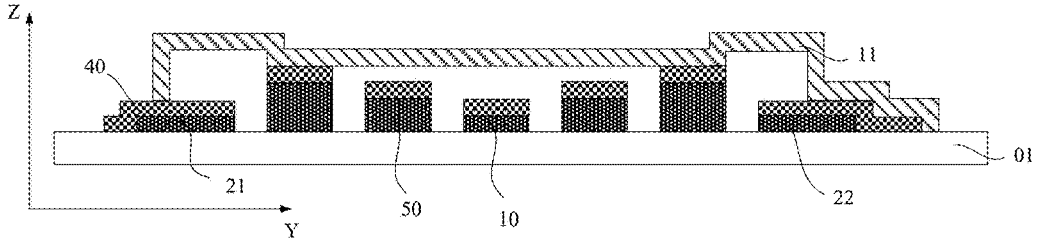
FIG. 5 is a schematic diagram illustrating that the DC bias voltage applied to a driving electrode and a signal electrode of a phase shifter according to an embodiment of the present disclosure is V1.
Figure 6:
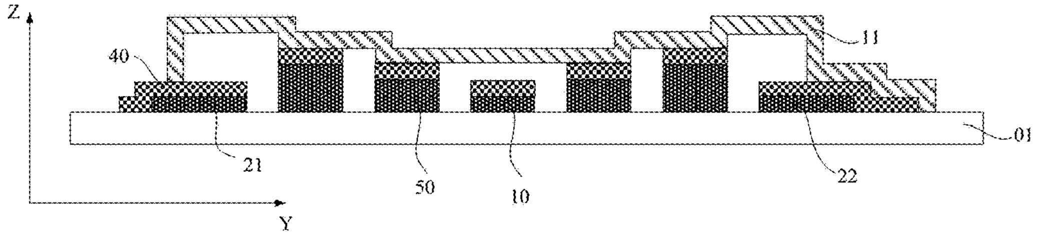
FIG. 6 is a schematic diagram illustrating that the DC bias voltage applied to a driving electrode and a signal electrode of a phase shifter according to an embodiment of the present disclosure is V2.
Figure 7:
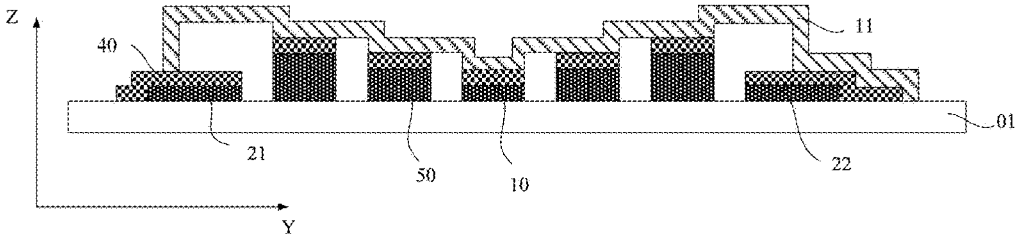
FIG. 7 is a schematic diagram illustrating that the DC bias voltage applied to a driving electrode and a signal electrode of a phase shifter according to an embodiment of the present disclosure is V3.

Further, with continued reference to FIG. 4, for any phase control unit 100, the height of each driving structure in the direction away from the substrate 01 is greater than the height of the signal electrode 10 in the direction away from the substrate 01, the number of the driving structures whose orthographic projections are located between the orthographic projections of the first ground electrode 21 and the signal electrode 10 on the substrate 01 is plural, and the heights of the driving structures monotonically decrease in the direction pointing from the first ground electrode 21 to the signal electrode 10; the number of the driving structures whose orthographic projections are located between the orthographic projections of the second ground electrode 22 and the signal electrode 10 on the substrate 01 is plural, and the heights of the driving structures monotonically decrease in the direction pointing from the second ground electrode 22 to the signal electrode 10. For example, two driving structures are arranged between the first ground electrode 21 and the signal electrode 10, two driving structures are arranged between the second ground electrode 22 and the signal electrode 10, the driving electrodes 50 positioned at two sides of the signal electrode 10 are in mirror symmetry by taking a central axis of the extending direction of the signal electrode 10 as a symmetry axis, the height of each driving structure is larger than that of the signal electrode 10, the heights of the driving structures between the first ground electrode 21 and the signal electrode 10 monotonically decrease in the direction pointing from the first ground electrode 21 to the signal electrode 10, and the heights of the driving structures between the second ground electrode 22 and the signal electrode 10 monotonically decrease in the direction pointing from the second ground electrode 22 to the signal electrode 10. In this case, when the DC bias voltage applied to each of the driving electrodes 50 and the signal electrode 10 is V0, the film bridge 11 of each phase control unit 100 is suspended above the driving structures and the signal electrode 10, as shown in FIG. 4; when the DC bias voltage applied to each of the driving electrodes 50 and the signal electrode 10 is V1, the film bridge 11 in each phase control unit 100 lands on two driving structures farthest from the signal electrode 10, as shown in FIG. 5; when the DC bias voltage applied to each of the driving electrodes 50 and the signal electrode 10 is V2, the film bridge 11 in each phase control unit 100 lands on all the driving structures, as shown in FIG. 6; when the DC bias voltage applied to each of the driving electrodes 50 and the signal electrode 10 is V3, the film bridge 11 in each phase control unit 100 lands on all the driving structures and the signal electrode 10, as shown in FIG. 7. That is, when the phase control unit 100 includes the driving structures having two heights different from the height of the signal electrode 10, the phase control unit 100 can operate in four states, that is, one phase control unit 100 can realize a plurality of phase shift degrees.

In addition, the phase shifter in the related art is as shown in FIG. 1, the minimum phase shift unit is a step, so a plurality of phase shift units are required to realize 360-degree phase shift capability. By taking a 5-bit digital phase shifter as an example, in the phase shifter in the related art, at least 31 MEMS film bridges 11 are required to form 5 phase control units 100, each phase control unit 100 can only achieve one phase shift amount, and 5 phase control units 100 respectively achieve phase shift amounts of 11.25°, 22.5°, 45°, 90°, and 180°. As shown in FIG. 3, the 5-bit digital phase shifter formed by combining the multi-step phase shift units according to the embodiment of the present disclosure only needs 16 MEMS film bridges 11 to achieve the same function. The 16 MEMS film bridges 11 form 5 phase control units 100, each phase control unit 100 can achieve a plurality of phase shift amounts, and the 5 phase control units 100 respectively achieve phase shift amounts of 11.25°/22.5°, 22.5°/45°, 45°/90°, and 90°/180°. The number of the phase control units 100 is greatly reduced, and the device area and cost are reduced (by taking two-step as an example, if three-step phase shift units are adopted, the number is further greatly reduced). In addition, in the MEMS phase control unit 100, the reduction of the movable components means a great improvement in the reliability and stability of the entire system, and the reduction of the film bridges 11 also makes the coplanar waveguide transmission line shortened, effectively reduces the insertion loss caused by the line loss, improves the device performance, and has very important significance. At present, the reliability and stability of the whole system are reduced due to the increase of the number of MEMS phase control units 100, a common digital MEMS phase shifter can only achieve 6 bits, but by adopting the design scheme of multi-step phase shift units, the phase shifting precision and the number of bits of the digital phase shifter can be improved while the number of units is greatly reduced.

Similarly, in some examples, similar to the structure in FIG. 4, when the height of each driving structure in the direction away from the substrate 01 is smaller than the height of the signal electrode 10 in the direction away from the substrate 01, the number of the driving structures whose orthographic projections are located between the orthographic projections of the first ground electrode 21 and the signal electrode 10 on the substrate 01 is plural, and the heights of the driving structures monotonically increase in the direction pointing from the first ground electrode 21 to the signal electrode 10; the number of the driving structures whose orthographic projections are located between the orthographic projections of the second ground electrode 22 and the signal electrode 10 on the substrate 01 is plural, and the heights of the driving structures monotonically increase in the direction pointing from the second ground electrode 22 to the signal electrode 10. This case is similar in principle to the above case, and therefore a detailed description is not given here.

To achieve the difference in height of at least part of the driving structures in each phase control unit 100, the following two implementations are provided in the embodiments of the present disclosure.

As a first exemplary embodiment, as shown in FIG. 4, each of the phase control units 100 includes a plurality of driving structures, each of the driving structures includes only a driving electrode 50 between the substrate 01 and the interlayer insulating layer 40, and the height of each of the driving electrodes 50 in the direction away from the substrate 01 is different from the height of the signal electrode 10 in the direction away from the substrate 01. In this case, the interlayer insulating layer 40 provided on the signal electrode 10, the driving electrodes 50, the first ground electrode 21, and the second ground electrode 22 has a uniform thickness.

Figure 8:
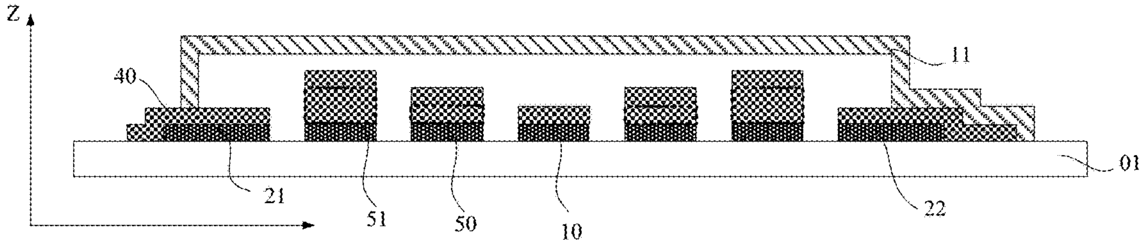
FIG. 8 is another cross-sectional view of the phase shifter of FIG. 3 along B-B'.

As a second exemplary embodiment, FIG. 8 is another cross-sectional view of the phase shifter of FIG. 3 along B-B'; as shown in FIG. 8, each phase control unit 100 includes therein a plurality of driving structures, each of which includes not only a driving electrode 50 between the substrate 01 and the interlayer insulating layer 40 but also a spacer 51 between the driving electrode 50 and the interlayer insulating layer 40; the height of each driving electrode 50 in the driving structure in any phase control unit 100 in the direction away from the substrate 01 is the same as the height of the signal electrode 10 in the direction away from the substrate 01, and the height of at least part of the spacers 51 in the direction away from the substrate 01 is different from the thickness of the interlayer insulating layer 40 in the direction away from the substrate 01, so that the height of at least part of the driving structures in each phase control unit 100 is different and is also different from the height of the signal electrode 10. In some exemplary embodiments, the spacer 51 and the interlayer insulating layer 40 are formed as one piece. In this case, the spacer 51 may be formed at the same time when the interlayer insulating layer is formed.

Figure 9:
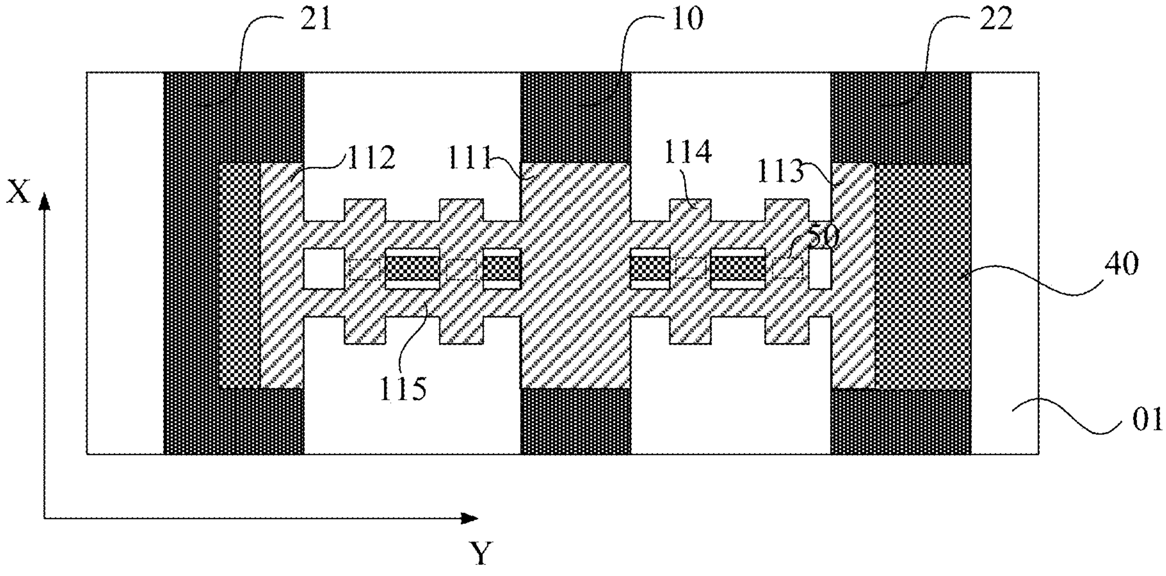
FIG. 9 is a top view of a phase shifter according to an embodiment of the present disclosure.

In some exemplary embodiments, when the phase shifter includes a plurality of phase control units 100, at least part of the phase control units 100 have a different number of film bridges 11, thereby achieving a plurality of phase shift degrees. Generally, each film bridge 11 in the phase shifter has the same structure, and referring to FIG. 9, in order to reduce the adsorption voltage of the film bridge 11, the film bridge 11 in the related art is improved in the embodiments of the present disclosure, and the film bridge 11 in the embodiments of the present disclosure includes a first connection wall, a second connection wall, and a bridge deck structure disposed opposite to the substrate 01; the first connection wall is at least partially overlapped with the orthographic projection of the first ground electrode 21 on the substrate 01, and the second connection wall is at least partially overlapped with the orthographic projection of the second ground electrode 22 on the substrate 01; the bridge deck structure includes: a first electrode portion 111, a second electrode portion 112, a first adsorption portion, and a second adsorption portion that extend in the first direction X, and at least one first connection portion 115 that extends in the second direction Y; the first electrode portion 111, the second electrode portion 112, the first adsorption portion and the second adsorption portion are arranged side by side and at intervals along the second direction Y; the orthographic projection of one first electrode portion 111 on the substrate 01 covers the orthographic projection of one signal electrode 10 on the substrate 01; the orthographic projection of one second electrode portion 112 on the substrate 01 covers the orthographic projection of one driving electrode 50 on the substrate 01; the first adsorption portion is electrically connected with the first connection wall, and the second adsorption portion is electrically connected with the second connection wall; the first connection portion 115 electrically connects the first electrode portion 111, the second electrode portion 112, the first adsorption portion, and the second adsorption portion. When the number of the first connection portions 115 is plural, the first connection portions 115 are arranged side by side and at intervals along the first direction X. As shown in FIG. 9, the bridge deck structure formed by connecting the first electrode portion 111, the second electrode portion 112, the first adsorption portion, and the second adsorption portion through the first connection portion 115 is a hollow pattern, so that when the phase shifter operates, the DC bias voltage applied to the film bridge 11 can be effectively reduced, thereby reducing power consumption.

Figure 10:
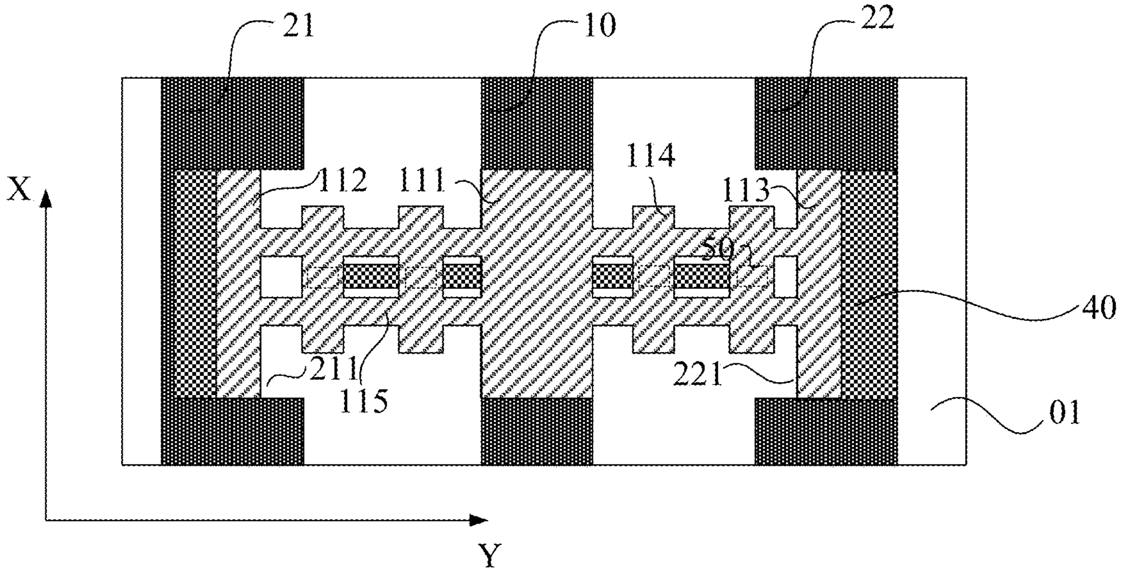
FIG. 10 is a top view of another phase shifter according to an embodiment of the present disclosure.

In one exemplary embodiment, referring to FIG. 10, the only difference from the phase shifter shown in FIG. 9 is in that a first groove is formed in the first ground electrode 21 and a second groove is formed in the second ground electrode 22. The size of the phase shifter can be reduced by providing the first groove and the second groove. The other structures of the phase shifter are the same as those of the phase shifter shown in FIG. 9, and thus, the description thereof is not repeated.

In one exemplary embodiment, the first connection wall and the second connection wall of the film bridge 11 are respectively located at two opposite ends of the bridge deck structure in the extending direction thereof, i.e., at two opposite ends of the bridge deck structure in the second direction Y; each of the first and second connection walls may have a plate structure and extend in the third direction Z, for example, in a direction perpendicular to the substrate 01. The first connection wall and the second connection wall each include a top surface and a bottom surface which are oppositely arranged along the third direction Z, the top surface of the first connection wall is at least partially overlapped with the orthographic projection of the first adsorption electrode 113 on the substrate 01, and the bottom surface of the first connection wall is arranged on the interlayer insulating layer above the first ground electrode 21; the top surface of the second connection wall is at least partially overlapped with the orthographic projection of the second adsorption electrode 114 on the substrate 01, and the bottom surface of the second connection wall is arranged on the interlayer insulating layer above the second ground electrode 22.

Figure 11:
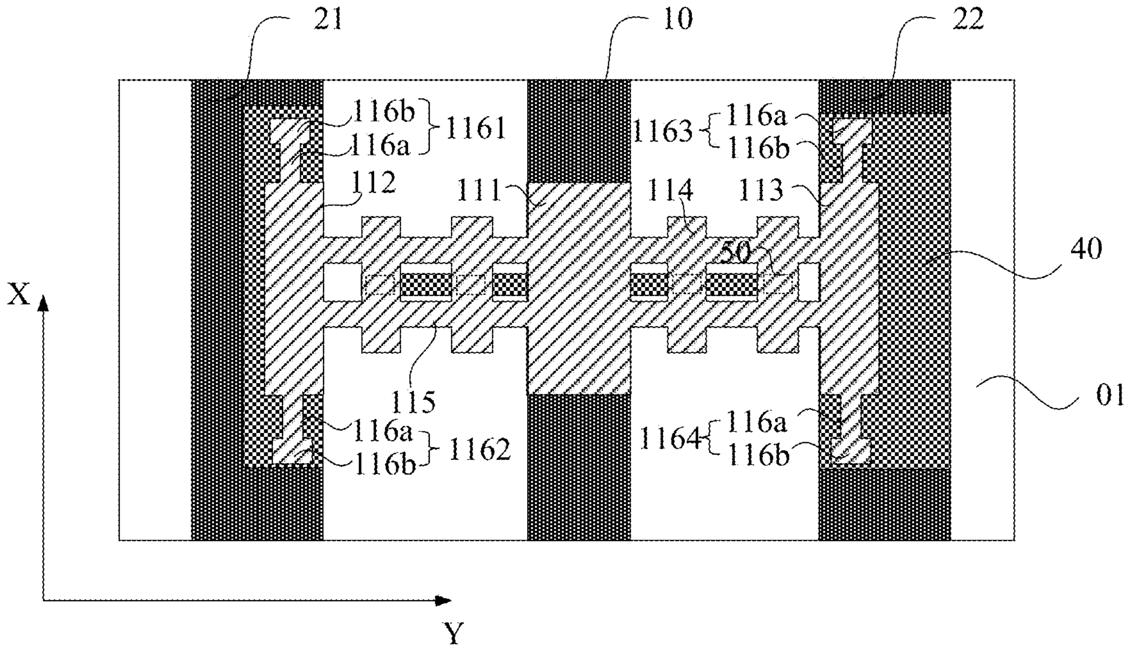
FIG. 11 is a top view of another phase shifter according to an embodiment of the present disclosure.

In another exemplary embodiment, FIG. 11 is a top view of another phase shifter according to an embodiment of the present disclosure; as shown in FIG. 11, the film bridge 11 differs from the film bridge 11 shown in FIG. 9 only in the structures of the first connection wall and the second connection wall of the film bridge 11. As shown in FIG. 11, the first connection wall in the film bridge 11 includes a first sub-connection wall 1161 and a second sub-connection wall 1162 respectively at two ends of the first adsorption electrode 113 in the extending direction thereof; the second connection wall includes a third sub-connection wall 1163 and a fourth sub-connection wall 1164 respectively at two ends of the second adsorption electrode 114 in the extending direction thereof; the first, second, third, and fourth sub-connection walls 1161, 1162, 1163, and 1164 each include a second connection portion **116*a* and a first anchor portion 116*b* electrically connected; the second connection portions 116*a* of the first and second sub-connection walls 1161 and 1162 are connected with the first adsorption portion; the second connection portions 116*a* of the third and fourth sub-connection walls 1163 and 1164 are connected with the second adsorption portion. The other structures of the film bridge 11 are the same as those of the film bridge 11 shown in FIG. 9**, and thus the description thereof will not be repeated.

Figure 12:
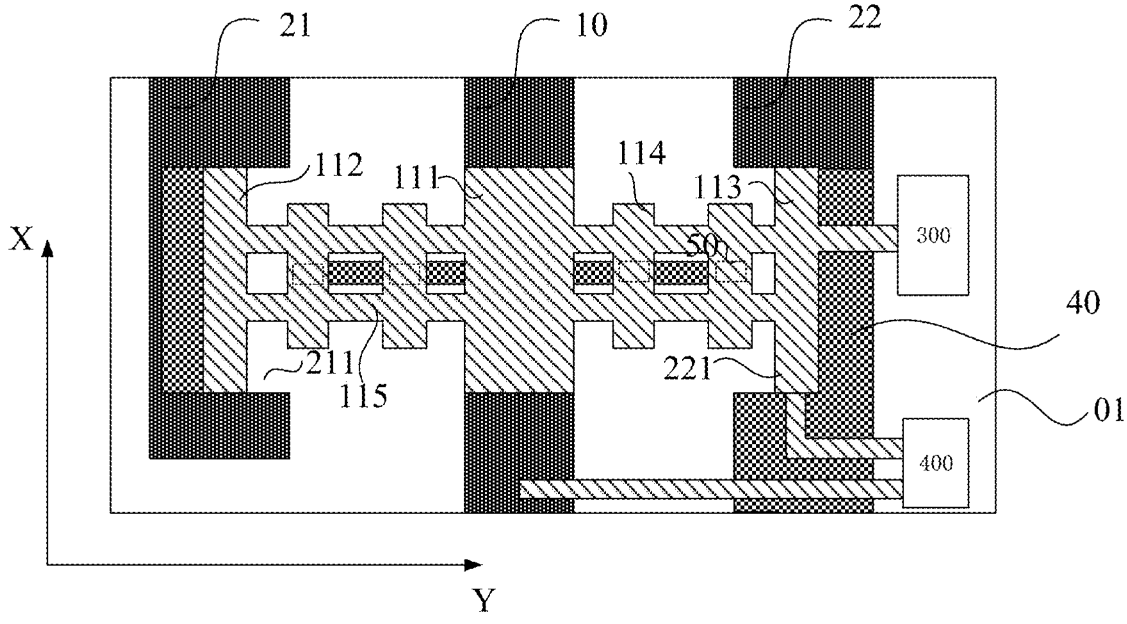
FIG. 12 is a top view of another phase shifter according to an embodiment of the present disclosure.

In some exemplary embodiments, FIG. 12 is a structure diagram of another phase shifter according to an embodiment of the present disclosure; as shown in FIG. 12, to further improve the phase adjustment capability of the phase shifter, the phase shifter further includes a first switch unit 300 disposed on the substrate 01, the first switch unit 300 is configured to provide a bias voltage signal to the film bridge 11 upon receipt of a first control signal. Because the phase shifter provided in the embodiments of the present disclosure further includes the first switch unit 300 disposed on the substrate 01, the first switch unit 300 can perform individual potential control on the film bridge 11 of the phase shifter where the first switch unit is located under the control of the first control signal, so that when a plurality of phase shifters provided in the embodiments of the present disclosure are used as a plurality of phase shift units to form a complex control circuit (such as an array antenna), the first control signals may be sent to the respective first switch units 300, to independently regulate and control the operating states of different phase shift units, accurately regulate and control the phase shift degree, and realize circuit level control of unit devices.

The circuit structure of the first switch unit 300 is not particularly limited in the embodiments of the present disclosure, for example, as an example of the embodiment of the present disclosure, the first switch unit 300 has a bias voltage input terminal, a first output terminal, and a first control terminal, the bias voltage input terminal is configured to receive a DC bias voltage signal, the first output terminal is electrically connected to the film bridge 11 through the DC bias line 02, and the first switch unit 300 is able to electrically connect the first output terminal and the bias voltage input terminal when the first control terminal receives the first control signal. To simplify the process, the DC bias line 02 and the film bridge 11 are arranged in the same layer, i.e., formed in the same patterning process.

Specifically, the circuit structure of the first switch unit 300 may be implemented by a thin film transistor (TFT), for example, the first switch unit 300 includes a first switch transistor, a first electrode of the first switch transistor is formed as the DC bias voltage input terminal of the first switch unit 300, a second electrode of the first switch transistor is formed as the first output terminal of the first switch unit 300 (i.e., the second electrode of the first switch transistor is electrically connected to the film bridge 11 through the DC bias line 02), a control electrode of the first switch transistor is formed as the first control terminal of the first switch unit 300, and the first switch transistor is capable of enabling electric connection between the first electrode and the second electrode when the control electrode receives the first control signal.

The inventor also found that the hysteresis effect of the existing phase shifter is often caused by residual charges in the frequent charging and discharging process, and the problem of reduced precision caused by different initial capacitance values of the phase shift units in the operating process occurs.

In order to solve the above-mentioned problem and improve the control accuracy of the phase shifter, as shown in FIG. 12, according to an embodiment of the present disclosure, the phase shifter further includes a second switch unit 400 disposed on the substrate 01, and the second switch unit 400 is configured to electrically connect a signal line and the film bridge 11 upon receipt of a second control signal. Specifically, as shown in FIG. 12, the second switch unit 400 may be electrically connected to the signal line through a connection line, and electrically connected to the film bridge 11 through the DC bias line 02.

In the phase shifter provided in the embodiment of the present disclosure, the second switch unit can electrically connect the signal line with the film bridge 11 upon receipt of the second control signal, so that a residual charge discharging loop is formed between the signal line and the film bridge 11, the hysteresis effect caused by the residual charges in the frequent charging and discharging process of the phase shift unit is solved, consistency of initial capacitance values of respective phase shift units in the operating processes is improved, and further, control accuracy of the phase shifter on a radio frequency signal phase is improved.

In order to improve process compatibility of the phase shifter, as another embodiment of the present disclosure, as shown in FIG. 12, the first switch unit 300 may be further directly configured to electrically connect the signal line to the film bridge 11 upon receipt of the second control signal.

Specifically, the circuit structure of the first switch unit 300 may be a MEMS single-pole double-throw switch, and with the single-pole double-throw switch, the operating loop is selected, and the operating state is switched, and selection is performed between the external driving circuit and the residual charge discharging circuit.

Figure 13:
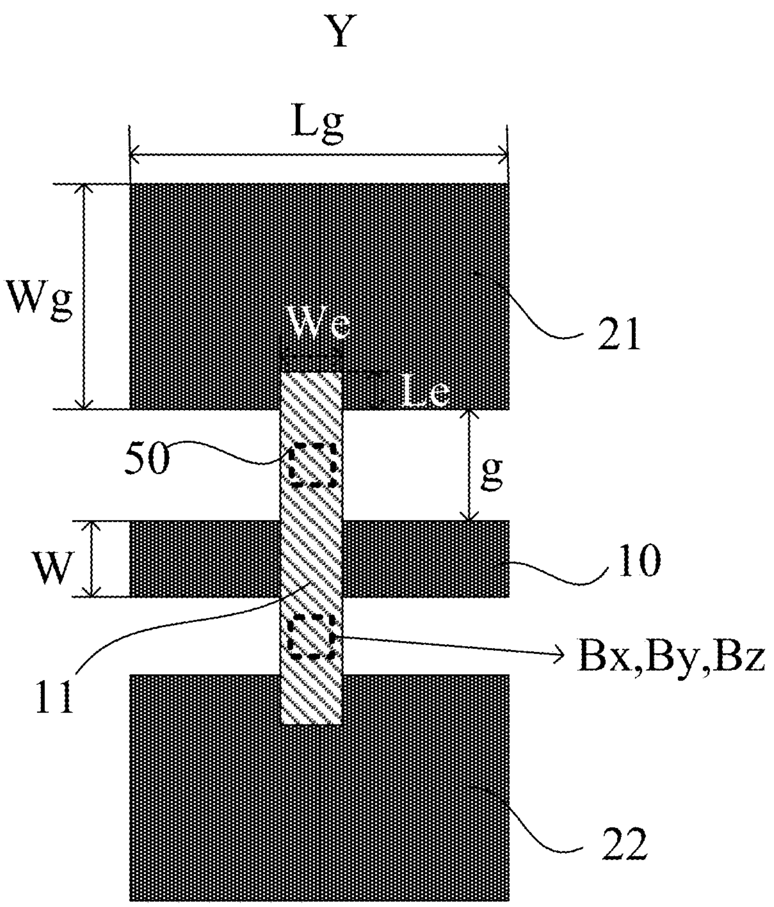
FIG. 13 is a top view of another phase shifter according to an embodiment of the present disclosure.
Figure 14:
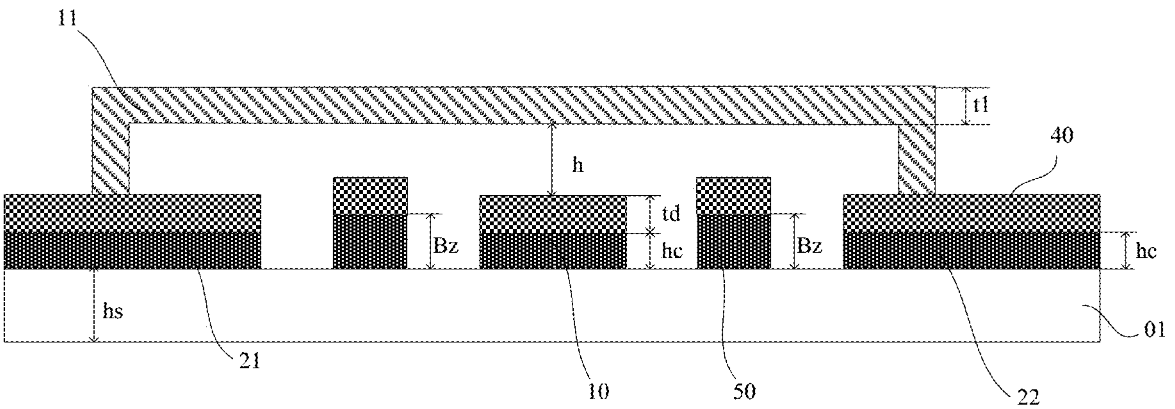
FIG. 14 is a schematic diagram illustrating a first state of the phase shifter of FIG. 13.

In order to make the effect of the phase shifter according the embodiments of the present disclosure more clear, explanation is given in connection with the simulation of HFSS software. FIG. 13 is a top view of another phase shifter according to an embodiment of the present disclosure; referring to FIG. 13, the first ground electrode 21 and the second ground electrode 22 have the same size, and the length, width, and height thereof are denoted by Lg, Wg and hc, respectively; the distance from each of the first ground electrode 21 and the second ground electrode 22 to the signal electrode 10 is denoted by g; the lengths of the portion of the film bridge 11 overlapped with the orthographic projection of the first ground electrode 21 on the substrate 01 and the portion of the film bridge 11 overlapped with the orthographic projection of the second ground electrode 22 on the substrate 01 are both denoted by Le, and the width of the film bridge 11 is denoted by We; the length and height of the signal electrode 10 are the same as those of the first ground electrode 21, and the width of the signal electrode 10 is denoted by W; the length, width, and height of the driving electrode 50 are denoted by Bx, By, and Bz, respectively. FIG. 14 is a schematic diagram illustrating a first state of the phase shifter of FIG. 13, i.e., a schematic diagram illustrating a state of Up State, as shown in FIG. 14, the thickness of the interlayer insulating layer 40 and the thickness of the film bridge 11 are denoted by td and t1, respectively; the thickness of the substrate 01 is denoted by hs, and at this time, the distance between the film bridge 11 and the interlayer insulating layer 40 is h. FIG. 15 is a schematic diagram illustrating a second state of the phase shifter of FIG. 13, i.e., a schematic diagram illustrating a state of Down State1 when the film bridge 11 is pulled down by 1.3 μm; FIG. 16 is a schematic diagram illustrating a second state of the phase shifter of FIG. 13, i.e., a schematic diagram illustrating a state of Down State2 when the film bridge 11 is pulled down by 1.4 μm; FIG. 17 is a schematic diagram of a HFSS software simulation of the phase shifter of FIG. 13; FIG. 18 is a schematic diagram illustrating port parameters and phase shift parameters of the phase shifter shown in FIG. 13 after HFSS software simulation; as shown in FIGS. 13 to 18, it can be seen that the greater the applied voltage, the greater the distance by which the film bridge 11 is pulled down, so that the film bridge 11 can land on the driving structures and the signal electrode 10 at different heights, thereby enabling one phase control unit 100 to realize a plurality of phase shift degrees.

In a second aspect, embodiments of the present disclosure provide an antenna, which includes any one of the phase shifters described above.

Since the antenna in the embodiments of the present disclosure includes the phase shifter described above, at least part of the phase control units 100 of the phase shifter includes the driving structure, and the driving structure is different from the signal electrode 10 in height in the direction away from the substrate 01, and no matter whether the driving structure or the signal electrode 10 is closer to the film bridge 11, the electrostatic attraction force to the film bridge 11 is larger when the voltage is applied to the driving electrode 50 and the signal electrode 10. When the applied voltage is gradually increased, the film bridge 11 lands on the driving structures and the signal electrode 10 of different heights from high to low in sequence to realize a plurality of stable operating states, thereby realizing multi-step phase shift. The realization of the multi-step phase shift unit is beneficial to improving the number of phase shifting bits and the phase shifting precision of the digital MEMS phase shifter. The phase shifter according to the embodiments of the present disclosure can realize the multiple operating states of a single phase control unit 100, thus, the number of the phase shift film bridges 11 adopted to form the digital MEMS phase shifter having a complete function is reduced, the reduction of movable components helps promoting the reliability and the stability of the entire system, and the reduction of the film bridges 11 also can make coplanar waveguide transmission line shortened, effectively reduce the insertion loss caused by the line loss, promote the device performance, and have very important significance.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and essence of the present disclosure, and such modifications and improvements are also considered to be within the scope of the present disclosure.

What is claimed is:

1. A phase shifter, comprising:

a substrate;

a signal electrode, and a first reference electrode and a second reference electrode respectively on two sides of an extending direction of the signal electrode; the signal electrode, the first reference electrode and the second reference electrode being all on the substrate;

an interlayer insulating layer on a side, away from the substrate, of the signal electrode, the first reference electrode and the second reference electrode;

at least one phase control unit, each of which comprises a film bridge on a side of the interlayer insulating layer away from the substrate; the signal electrode being in a space enclosed by the film bridge and the substrate, and two ends of the film bridge being respectively overlapped with orthographic projections of the first reference electrode and the second reference electrode on the substrate; and wherein at least part of the at least one phase control unit further comprises at least one driving structure between the substrate and the interlayer insulating layer, the driving structure comprises at least a driving electrode; at least part of the at least one driving structure has a different height from a height of the signal electrode in a direction away from the substrate; the driving structure in each phase control unit is at least partially overlapped an orthographic projection of the film bridge on the substrate.

2. The phase shifter of claim 1, wherein each phase control unit comprises a plurality of driving structures, and an orthographic projection of a part of the plurality of driving structures on the substrate is between orthographic projections of the first reference electrode and the signal electrode on the substrate, and an orthographic projection of the other part of the plurality of driving structures on the substrate is between orthographic projections of the second reference electrode and the signal electrode on the substrate.

3. The phase shifter of claim 2, wherein for any one of the phase control units, a number of the driving structures whose orthographic projections are between the orthographic projections of the first reference electrode and the signal electrode on the substrate is plural, and heights, in the direction away from the substrate, of the driving structures whose orthographic projections are between the orthographic projections of the first reference electrode and the signal electrode on the substrate are different; and/or a number of the driving structures whose orthographic projections are between the orthographic projections of the second reference electrode and the signal electrode on the substrate is plural, and heights, in the direction away from the substrate, of the driving structures whose orthographic projections are between the orthographic projections of the second reference electrode and the signal electrode on the substrate are different.

4. The phase shifter of claim 2, wherein for any one of the phase control units, the plurality of driving structures are mirror-symmetrical by taking a central axis of the signal electrode as a symmetry axis.

5. The phase shifter of claim 2, wherein for any one of the phase control units, a height of each of the plurality of driving structures in the direction away from the substrate is greater than the height of the signal electrode in the direction away from the substrate, a number of the driving structures whose orthographic projections are between the orthographic projections of the first reference electrode and the signal electrode on the substrate is plural, and heights of the driving structures whose orthographic projections are between the orthographic projections of the first reference electrode and the signal electrode on the substrate monotonically decrease in a direction pointing from the first reference electrode to the signal electrode; a number of the driving structures whose orthographic projections are between the orthographic projections of the second reference electrode and the signal electrode on the substrate is plural, and heights of the driving structures whose orthographic projections are between the orthographic projections of the second reference electrode and the signal electrode on the substrate monotonically decrease in a direction pointing from the second reference electrode to the signal electrode; or, the height of each of the plurality of driving structures in the direction away from the substrate is smaller than the height of the signal electrode in the direction away from the substrate, the number of the driving structures whose orthographic projections are between the orthographic projections of the first reference electrode and the signal electrode on the substrate is plural, and the heights of the driving structures whose orthographic projections are between the orthographic projections of the first reference electrode and the signal electrode on the substrate monotonically increase in the direction pointing from the first reference electrode to the signal electrode; the number of the driving structures whose orthographic projections are between the orthographic projections of the second reference electrode and the signal electrode on the substrate is plural, and the heights of the driving structures whose orthographic projections are between the orthographic projections of the second reference electrode and the signal electrode on the substrate monotonically increase in the direction pointing from the second reference electrode to the signal electrode.

6. The phase shifter of claim 1, wherein the driving structure in any one of the phase control units comprises only the driving electrode, and a height of at least part of the driving electrodes in the direction away from the substrate is different from the height of the signal electrode in the direction away from the substrate.

7. The phase shifter of claim 1, wherein each driving structure further comprises a spacer between the driving electrode and the interlayer insulating layer; a height in the direction away from the substrate of each driving electrode in the driving structure in any one of the phase control units is the same as the height of the signal electrode in the direction away from the substrate, and a height of at least part of the spacers in the direction away from the substrate is different from a thickness of the interlayer insulating layer in the direction away from the substrate.

8. The phase shifter of claim 7, wherein the spacer and the interlayer insulating layer on each driving electrode are formed as a single piece.

9. The phase shifter of claim 1, wherein the film bridge comprises a first connection wall, a second connection wall, and a bridge deck structure opposite to the substrate; the first connection wall is at least partially overlapped with an orthographic projection of the first reference electrode on the substrate, and the second connection wall is at least partially overlapped with an orthographic projection of the second reference electrode on the substrate; the bridge deck structure comprises: a first electrode portion, a second electrode portion, a first adsorption portion, a second adsorption portion and at least one first connection portion; an orthographic projection of one first electrode portion on the substrate covers an orthographic projection of one signal electrode on the substrate; an orthographic projection of one second electrode portion on the substrate covers an orthographic projection of one driving electrode on the substrate; the first adsorption portion is electrically connected with the first connection wall, and the second adsorption portion is electrically connected with the second connection wall; the first connection portion electrically connects the first electrode portion, the second electrode portion, the first adsorption portion, and the second adsorption portion.

10. The phase shifter of claim 9, wherein the first and second connection walls are at two opposite ends of an extending direction of the bridge deck structure, respectively; and the first connection wall is at least partially overlapped with an orthographic projection of the first adsorption portion on the substrate, and the second connection wall is at least partially overlapped with an orthographic projection of the second adsorption portion on the substrate.

11. The phase shifter of claim 9, wherein the first connection wall comprises a first sub-connection wall and a second sub-connection wall respectively at two ends of the first adsorption portion in an extending direction thereof; the second connection wall comprises a third sub-connection wall and a fourth sub-connection wall respectively at two ends of the second adsorption portion in an extending direction thereof;

the first sub-connection wall, the second sub-connection wall, the third sub-connection wall and the fourth sub-connection wall each comprise a second connection portion and a first anchor portion which are electrically connected; the second connection portions of the first sub-connection wall and the second sub-connection wall are connected to the first adsorption portion; the second connection portions of the third sub-connection wall and the fourth sub-connection wall are connected to the second adsorption portion.

12. The phase shifter of claim 1, wherein the phase shifter further comprises a first switch unit on the substrate, and the first switch unit is configured to provide a bias voltage signal to the film bridge upon receipt of a first control signal.

13. The phase shifter of claim 12, wherein the first switch unit comprises a first switch transistor having a first electrode formed as a bias voltage input terminal of the first switch unit, a second electrode formed as a first output terminal of the first switch unit, and a control electrode formed as a first control terminal of the first switch unit, and the first switch transistor is configured to cause conduction between the first electrode and the second electrode in response to receiving the first control signal at the control electrode.

14. The phase shifter of claim 12, further comprising a second switch unit on the substrate, configured to electrically connect the signal electrode to the film bridge upon receipt of a second control signal.

15. The phase shifter of claim 12, wherein the first switch unit is further configured to electrically connect the signal electrode to the film bridge upon receipt of a second control signal.

16. The phase shifter of claim 1, wherein a number of the film bridges in at least part of the phase control units is different; in each phase control unit, the film bridge is overlapped with an orthographic projection of the driving structure on the substrate.

17. An antenna, comprising the phase shifter of claim 1.

* * * * *